(12) United States Patent
Marze

(10) Patent No.: US 8,061,962 B2
(45) Date of Patent: Nov. 22, 2011

(54) METHOD OF OPTIMIZING A DUCTED ANTI-TORQUE ROTOR OF A ROTORCRAFT, IN PARTICULAR A HELICOPTER, TO MINIMIZE ACOUSTIC ANNOYANCE, AND A DUCTED ANTI-TORQUE ROTOR OBTAINED THEREBY

(75) Inventor: Henri-James Marze, Rognac (FR)

(73) Assignee: Eurocopter, Marignane Cedex (FR)

( * ) Notice: Subject to any disclaimer, the term of this patent is extended or adjusted under 35 U.S.C. 154(b) by 529 days.

(21) Appl. No.: 12/361,677

(22) Filed: Jan. 29, 2009

(65) Prior Publication Data

US 2010/0232928 A1    Sep. 16, 2010

(30) Foreign Application Priority Data

Jan. 30, 2008    (FR) ...................................... 08 00499

(51) Int. Cl.
*F04D 27/02*    (2006.01)
(52) U.S. Cl. .......................................................... 415/1
(58) Field of Classification Search .............. 415/1, 119; 416/238, 189 R; 701/5, 2; 244/17.21, 17.19, 244/1
See application file for complete search history.

(56) References Cited

U.S. PATENT DOCUMENTS

| | | | | |
|---|---|---|---|---|
| 3,747,343 A * | 7/1973 | Rosen | .......................... | 60/226.1 |
| 4,626,173 A * | 12/1986 | Mouille et al. | ............ | 416/134 A |
| 4,809,931 A * | 3/1989 | Mouille et al. | ............. | 244/17.21 |
| 5,108,044 A * | 4/1992 | Weiner et al. | ............... | 244/17.19 |
| 5,131,604 A * | 7/1992 | Yoerkie et al. | ............. | 244/17.19 |
| 5,251,847 A * | 10/1993 | Guimbal | .................... | 244/17.19 |
| 5,566,907 A | 10/1996 | Marze et al. | | |
| 5,634,611 A * | 6/1997 | Marze et al. | ............... | 244/17.19 |
| 5,810,285 A * | 9/1998 | LeMasurier | ............... | 244/17.19 |
| 6,290,171 B1 * | 9/2001 | Dequin et al. | ............. | 244/17.19 |
| 6,461,106 B1 * | 10/2002 | Rahier | ............................. | 416/1 |
| 7,461,819 B2 * | 12/2008 | Eglin | ........................... | 244/195 |
| 7,959,105 B2 * | 6/2011 | Marze | ........................ | 244/17.19 |
| 2009/0121075 A1 * | 5/2009 | Marze | ........................ | 244/17.19 |

FOREIGN PATENT DOCUMENTS

FR    2719549    11/1995

OTHER PUBLICATIONS

French Search Report dated Sep. 18, 2008 from corresponding FR Application 0800499.

* cited by examiner

*Primary Examiner* — Alexander Gilman

(74) *Attorney, Agent, or Firm* — Brooks Kushman P.C.

(57) ABSTRACT

The present invention relates to a method of minimizing the noise emitted by a ducted rail rotor anti-torque device at a frequency FE and perceived at a frequency FP, in which method the diameter D, the number of blades b, and the tangential speed U of the rotor are determined so that the perceived frequency FP is less than or equal to the bottom limit frequency FL of a predetermined one-third frequency octave centered on a frequency FC.

13 Claims, 5 Drawing Sheets

$FLI = \dfrac{FC}{\sqrt{2}}$    FC    $FLS = FC \times \sqrt{2}$

FLI    FLS $FL = \dfrac{FC}{\sqrt[6]{2}}$    FC    $FS = \sqrt[6]{2} \times FC$

METHOD OF OPTIMIZING A DUCTED ANTI-TORQUE ROTOR OF A ROTORCRAFT, IN PARTICULAR A HELICOPTER, TO MINIMIZE ACOUSTIC ANNOYANCE, AND A DUCTED ANTI-TORQUE ROTOR OBTAINED THEREBY

FIELD OF THE INVENTION

The present invention relates to a method of minimizing the acoustic annoyance due to a ducted tail rotor anti-torque device of the kind the Applicant calls Fenestron®.

BACKGROUND OF THE INVENTION

A rotorcraft, and in particular a helicopter, is fitted with at least one engine to provide it with lift and propulsion. The engine is fastened to the structure of said rotorcraft and produces driving torque used for rotating the main rotor. The reaction to a single main rotor generates torque in yaw tending to cause the fuselage to turn in the opposite direction to the direction of rotation of the main rotor. In order to compensate this torque, manufacturers generally install a tail or "anti-torque" rotor at the rear of a rotorcraft fuselage, which rotor has blades that are nearly always of variable pitch and under the control of the pilot using the pedals.

Naturally, such an anti-torque rotor also contributes to performing yaw maneuvers and to steering the rotorcraft.

The Fenestron® anti-torque device comprises a ducted rotor or propeller of diameter that is smaller than the diameter of a conventional tail rotor, in particular because of the need to incorporate it in the tail structure of the rotorcraft. Ducting covers the propeller and channels the aerodynamic flow. The rotor housed in this way within a duct has a larger number of blades than that of a conventional tail rotor because of the small diameter of the propeller. For example, the Fenestron® of the Gazelle® helicopter (total weight 2000 kilograms (kg)) designed by the Applicant has 13 blades, whereas the conventional tail rotor of the Super Puma® helicopter, also from the same Applicant, has only four blades even though the rotorcraft has a total weight of about 9000 kg.

Whether conventional or ducted, a tail rotor is a source of noise of aerodynamic origin, as are the engines. The other noises have mechanical sources: engine gearboxes, main transmission box and auxiliary equipment, tail transmission, structural vibration.

In general, the noise problem has two distinct aspects:
noise external to the rotorcraft; and
internal noise, i.e. noise within a cabin of the rotorcraft.

Under such conditions, the invention applies more particularly to a method of minimizing the external noise generated by a ducted tail rotor anti-torque device, and consequently the invention also relates to a ducted tail rotor anti-torque device obtained by said method. As a natural consequence, internal noise is also reduced.

From the point of view of external noise, it is fundamental that the noise produced at short distances from the takeoff and landing zone does not lead to excessive annoyance.

Furthermore, the use of a rotorcraft in a built-up area also implies flying over an inhabited area and consequently to generating sound nuisance for the population.

Similarly, using a rotorcraft for military purposes also requires consideration to be given to sound emission, since noise enables a rotorcraft to be detected prematurely and to be identified.

Furthermore, it is specified by way of information that the design and disposition of a ducted tail rotor anti-torque device, its rotary drive means, and its means for collective control of the pitch of its blades, and also the advantages of this configuration, are all described in numerous patents in the name of the Applicant, amongst which particular mention can be made of French patents FR 1 531 536 and FR 2 534 222 that describe rotors with blades that are uniformly distributed angularly and that correspond respectively to means for changing the pitch simultaneously of all of the blades, and to various features concerning in particular the blades, and also to an arrangement whereby a rotor and a "deflector" stator are combined for the purpose of recovering the rotary energy from the airflow downstream from the rotor, and using it in the form of axial thrust.

It is also important to mention French patents FR 2 719 549, FR 2 719 550, and FR 2 719 551 in the name of the Applicant and relating to a ducted tail rotor anti-torque device comprising a rotor with a deflector stator, the blades of the ducted rotor then not being uniformly distributed angularly. More precisely, said blades have an angular distribution with an irregular azimuth modulation determined by a sinusoidal relationship so as to contribute to diminishing the noise caused by air flowing through the duct.

That said, it is established that the noise from a rotor comes both from stable and from fluctuating aerodynamic loads acting on the blades. When analyzed using narrow band noise analysis, that noise appears in the form of multiple distinct frequencies, with multiple tones at the frequency at which the blades go past a reference point, referred to more simply as the "blade frequency".

In other words, the product of a speed of rotation $\Omega$ expressed in hertz (Hz), i.e. in revolutions per second, multiplied by a given number b of blades (where b is greater than the number to be found on a conventional tail rotor) gives a blade frequency (b$\Omega$) and multiples thereof ("x": multiplication sign), in the following form F:

for a rotor with uniform distributed blades:

$$F = n \times b \times \Omega$$

where n equals a positive integer;
for a rotor having non-uniformly distributed blades:

$$F = [(n \times b) \pm m] \times \Omega$$

where n, m are positive integers.

These frequencies in which acoustic energy is concentrated are much higher than the frequencies that occur with a conventional tail rotor, and these frequencies typically lie in the range 400 Hz to 2000 Hz, with the fundamental frequency generally being situated in the range 400 Hz to 600 Hz, and with harmonics of significant level up to very high numbers, the acoustic levels of these harmonics increasing in principle with the "helical" Mach number at the ends of the blades (combination of the circumferential speed at the tips of the blades and the axial speed of the airflow, i.e. substantially normal to the plane of rotation of said blades).

The above frequencies that apply to any ducted anti-torque rotor are attenuated very quickly in the atmosphere. Nevertheless, the fact of raising the frequencies at which acoustic energy is concentrated places said frequencies in a frequency zone where the human ear has maximum sensitivity. Furthermore, the highly impulsive appearance of the noise spectrum of a ducted anti-torque rotor, where most of the acoustic energy is concentrated on two or three very narrow primary spectrum lines, gives rise to a whistling sound that is painful for the human ear, and that is penalized by the criteria for acoustic certification that make use of "emerging spectrum line or pure tone correction".

The above-mentioned solution consisting in placing the blades so that they are not uniformly distributed performs acoustic interferometry, thereby avoiding concentrating all of the acoustic energy essentially on the fundamental frequency (highest acoustic level), or on a few harmonics, but instead spreading said acoustic energy over intermediate frequencies (between 0 and bΩ, bΩ and 2bΩ, ... for example), better tolerated by the human ear, which cannot distinguish between two pure tones when they are separated by less than one-third of an octave, thereby attenuating the whistling sound.

OBJECT AND SUMMARY OF THE INVENTION

An object of the invention is to propose a method of making a ducted tail rotor anti-torque device with minimum acoustic nuisance, for fitting to a rotorcraft, and in particular a helicopter that is propelled by means of a main rotor, and possibly even improving the aerodynamic performance of said device, which device is optionally fitted with a deflecting stator, in comparison with presently-known assemblies of this type.

Furthermore, the method of the invention and the ducted tail rotor anti-torque device obtained thereby enable another object to be achieved, namely better satisfying various practical requirements for known ducted anti-torque rotors, in particular concerning the requirements of regulations for certifying civil aircraft.

Under such conditions, the method of the invention is used to determine criteria that need to be satisfied concerning certain design parameters of a ducted tail rotor anti-torque device and of the corresponding rotorcraft in order to obtain a ducted tail rotor anti-torque device that presents a minimum of annoyance in the meaning of noise standards for rotorcraft, in particular for helicopters, such as those that express acoustic annoyance on the basis of the notion of "tone perceived noise level" (more simply TPNL) and expressed in TPNdB, in compliance with the recommendations governing aviation, for example:

International Civil Aviation Organization (ICAO), annex 16, chapter 8;
Federal Aviation Regulations (FAR), part 36, appendix H, chapter 18.

According to the invention, the above-mentioned objects are achieved by a method of optimizing a ducted rail rotor anti-torque device for a rotorcraft certified at a forward velocity V, in particular for a helicopter, comprising a multi-bladed rotor of diameter D with a given number b of variable-pitch blades mounted to rotate at a speed of rotation Ω substantially coaxially in an airflow duct of axis extending substantially transversely relative to the rotorcraft and passing through a fairing incorporated in the rear portion of the rotorcraft, wherein the following steps are performed:

a bottom limit frequency FL is selected for a predetermined one-third octave centered on a center frequency FC;
the perceived frequency FP of the tone produced by said ducted tail rotor anti-torque device is determined by multiplying the emission frequency FE of that tone by a multiplicative coefficient C to take account of the Doppler effect, i.e.:

$$FP = C \times FE$$

the parameters relating to the diameter D of the rotor, the given number b of blades, and to the tangential speed U at the ends of the blades are selected so that the perceived frequency FP of the tone as given by:

$$C \times [U \times (n \times b) \pm m]/(\pi \times D)$$

is less than the bottom limit frequency FL of a predetermined one-third octave centered on a frequency FC, n and m being positive integers, and the sign "/" corresponds to division.

As described in greater detail below, it is established by convention that scales in octave frequency bands and in one-third octave frequency bands are used to represent the spectrum of a noise, with each octave band being subdivided into three one-third octave bands. Consequently, the bottom limit frequency FL of a one-third octave centered on a center frequency FC is given by:

$$FL = \frac{FC}{\sqrt[6]{2}}$$

Furthermore, it is important to observe that the perceived frequency FP of a tone differs from the emission frequency FE because of the Doppler effect, i.e. the phenomenon whereby the apparent frequency of a vibratory motion varies depending on the velocity of the source relative to an observer. In practice, if a rotorcraft is heading fast towards an observer, the perceived frequency FP of the tone is higher than in emission frequency FE.

Consequently, when designing a ducted tail rotor anti-torque device that is optimized from the point of view minimizing external acoustic annoyance, account is taken in the invention firstly of the acoustic certification forward velocity V of the rotorcraft and secondly of a temperature and an observation angle below and above which respectively the perceived frequency FP remains strictly less than the bottom limit frequency FL of the predetermined one-third octave. In other words, given that the emission frequency FE and the perceived frequency FP are such that:

$$FP = C \times FE$$

it is accepted, as described in greater detail below, that the multiplicative coefficient C is written as follows:

$$C = \frac{1}{1 - (M \times \cos\theta e)}$$

The term M designates the Mach number of the noise-emitting source, i.e. of the anti-torque device, traveling at a forward velocity V, i.e. if the term "a" designates the speed of sound at a given temperature:

$$M = \frac{V}{a}$$

The term θe corresponds to the angle formed between the forward velocity V and the "source-observer" axis.

By way of explanation, it can be observed that the expression for the blade frequency is indeed identical to the tone emission frequency FE as expressed above. Specifically:

$$F = [(n \times b) \pm m] \times \Omega, \quad F \text{ and } \Omega \text{ in Hz}$$

$$= \frac{\omega}{2\pi}[(n \times b) \pm m], \quad \omega \text{ in rd/s}$$

with $$U = \omega \times \frac{D}{2},$$

D in meters and U in meters per second
i.e.:

F=FE

To sum up, the parameters D, U, and b need to be selected so as to satisfy the following criterion:

$$\frac{U \times [(n \times b) \pm m]}{D} < \frac{\pi \times FC}{\sqrt[6]{2}} \times \left[1 - \left(\frac{V}{a} \times \cos\theta e\right)\right]$$

Advantageously, this criterion is preferably applied as follows:
  only the fundamental frequency of the spectrum is selected, i.e. n=1 and m=0;
  the predetermined one-third octave that is used corresponds to a center frequency FC of 500 Hz, this frequency corresponding to a limit in the standards, as explained below;
  a forward velocity V is determined that corresponds to the noise certification velocity for the rotorcraft, i.e. for example:

$$V=(0.45 \times VH)+65 \text{ kts}$$

where VH is the maximum velocity of the rotorcraft at maximum weight at 25° C. and at a "pressure altitude" of zero;
  θe is selected in the range 30 degrees to 45 degrees; and
  an air temperature is selected lying in the range 15° C. to 25° C., and preferably 25° C., which corresponds to a speed of sound of 346 m/s.

Naturally, this preferred application is not exclusive in any way, and can be adapted in particular as a function of the requirements of regulations.

The present invention also provides a ducted tail rotor anti-torque device for controlling and steering a rotorcraft in yaw.

The invention provides an anti-torque device for a rotorcraft that is acoustically certified at a forward velocity V, in particular for a helicopter, the device comprising a multi-bladed rotor of diameter D having a given number b of variable pitch blades, mounted to rotate substantially coaxially in an airflow duct of axis extending substantially transversely relative to the rotorcraft and passing through a fairing incorporated in the rear portion of the rotorcraft, which device is remarkable in that the parameters relating to the diameter D of the rotor, to the given number b of blades, and to the tangential speed U, equal to Ω×(D×2), at the ends of the blades are such that:

$$\frac{U \times [(n \times b) \pm m]}{D} < \frac{\pi \times FC}{\sqrt[6]{2}} \left[1 - \left(\frac{V}{a} \times \cos\theta e\right)\right]$$

where n and m are positive integers, FC is the center frequency of a predetermined one-third octave, and a and θe represent respectively the speed of sound and the angle between the forward velocity V and the axis between the noise source, i.e. the anti-torque device and the observer.

Advantageously, and preferably, the following apply:
  the integer n is equal to 1;
  the center frequency FC is 500 Hz;
  the forward velocity V of the rotorcraft, assuming VH designates the maximum velocity of the rotorcraft, is:

$$[(0.45 \times VH)+65 \text{ kts}]$$

the angle θe lies in the range 30 degrees to 45 degrees; and
  the air temperature lies in the range 15° C. to 25° C., preferably 25° C., giving a speed of sound of 346 m/s.

Advantageously, a ducted tail rotor anti-torque device may also include a deflector stator with stationary vanes located downstream in the rotor in the duct formed by the fairing, thereby enabling an anti-torque device to be provided that is compact, balanced, and rigid that, without modifying the power needed to drive the rotor, provides increased anti-torque thrust, while minimizing acoustic annoyance.

BRIEF DESCRIPTION OF THE DRAWINGS

The invention and its advantages appear in greater detail in the context of the following description of an embodiment given by way of illustration and with reference to the accompanying figures, in which.

Elements present in two or more of the figures are given the same references in each of them.

MORE DETAILED DESCRIPTION

Figure 1:
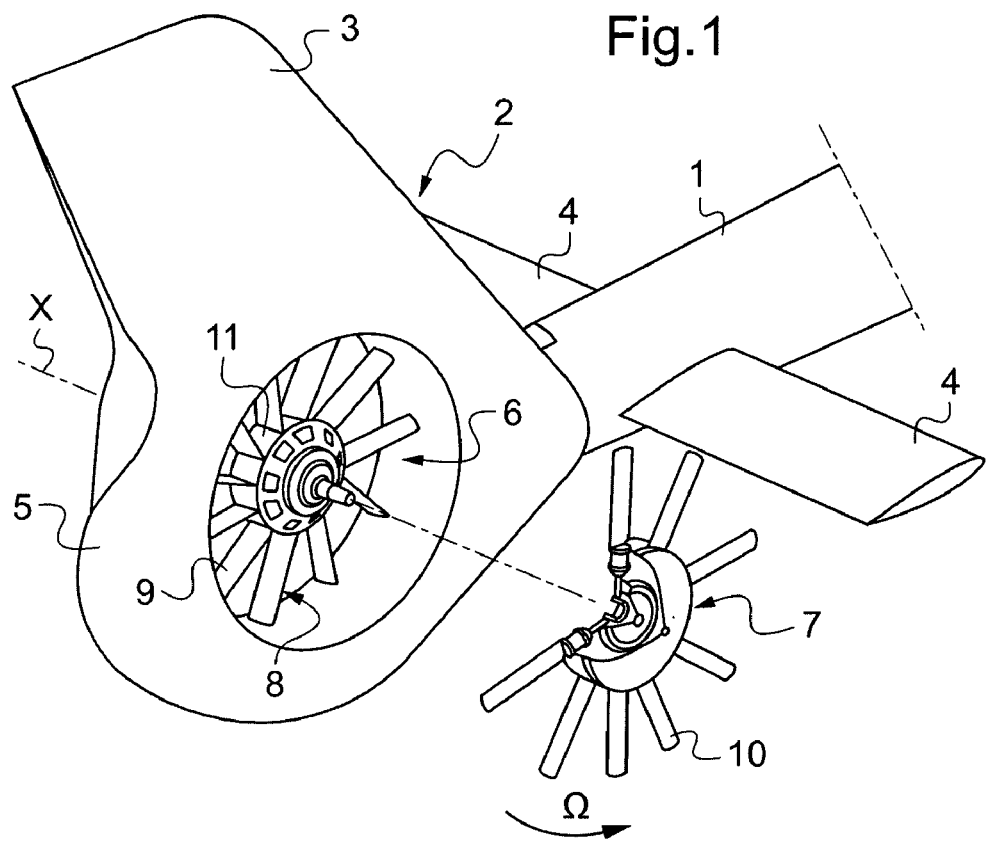
FIG. 1 is a three-quarters rear perspective view of a ducted anti-torque device with a rotor and a deflector stator disposed in a duct passing through a fairing at the rear end of the tail boom of a helicopter and at the base of its tail fin, the rotor being shown extracted from the duct and partially cut away, for greater clarity.

FIG. 1 shows the tail boom 1 of a helicopter having a fuselage and a single main rotor that are not shown, the tail boom supporting at it rear end a vertical tail fin 3 for assisting in yaw control, and supporting further forwards a tailplane comprising two portions 4 projecting on either side of the boom 1 to assist in controlling the helicopter in pitch.

The base of the tail fin 3 has a fairing 5 pierced transversely by a duct 6 through which there flows the air of a ducted anti-torque device 2 comprising a multi-bladed rotor 7 of diameter D with a given number b of variable-pitch blades 10 and mounted to rotate at an angular speed of rotation Ω substantially coaxially within the duct 6, together with a deflector stator 8 stationary in the duct 6 and downstream from the rotor 7 relative to the flow direction of air passing through the duct 6, the stator comprising stationary vanes 9 disposed substantially in a star configuration about the axis X-X of the duct 6.

Figure 2:
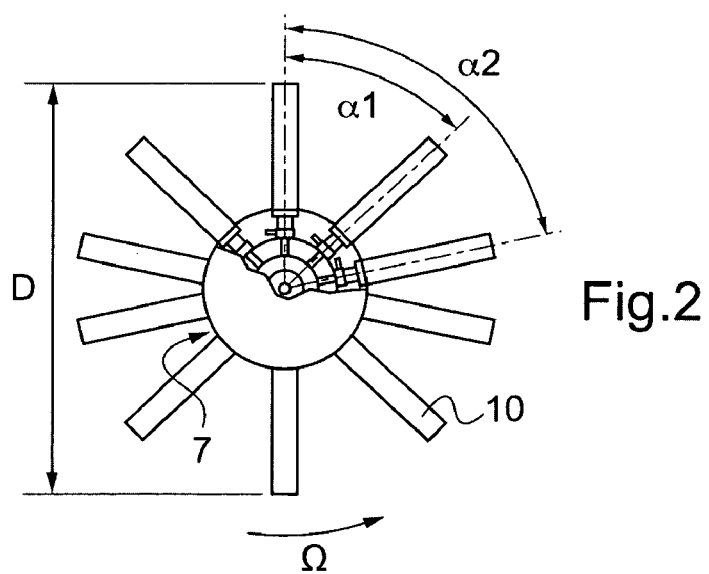
FIG. 2 is a diagrammatic side elevation view of the rotor and the stator of FIG. 1, with the blades presenting irregular azimuth modulation.

For a rotor with a given number b of blades 10, an example of irregular azimuth or phase modulation is shown in FIG. 2 (α2 not equal to 2×α1 and b=10). The purpose of this phase modulation is to break the usual angular symmetry or the usual uniform angular distribution of the blades of a rotor, not so as to reduce the acoustic energy emitted, but so as to distribute it more favorably over the frequency spectrum, unlike that which happens in the absence of such modulation (blades uniformly distributed) where energy is concentrated on particular frequencies (bΩ, 2bΩ, 3bΩ, . . . : it being understood that for simplification purposes, Ω is multiplied respectively by b, 2b, 3b, . . . ).

Figure 3:
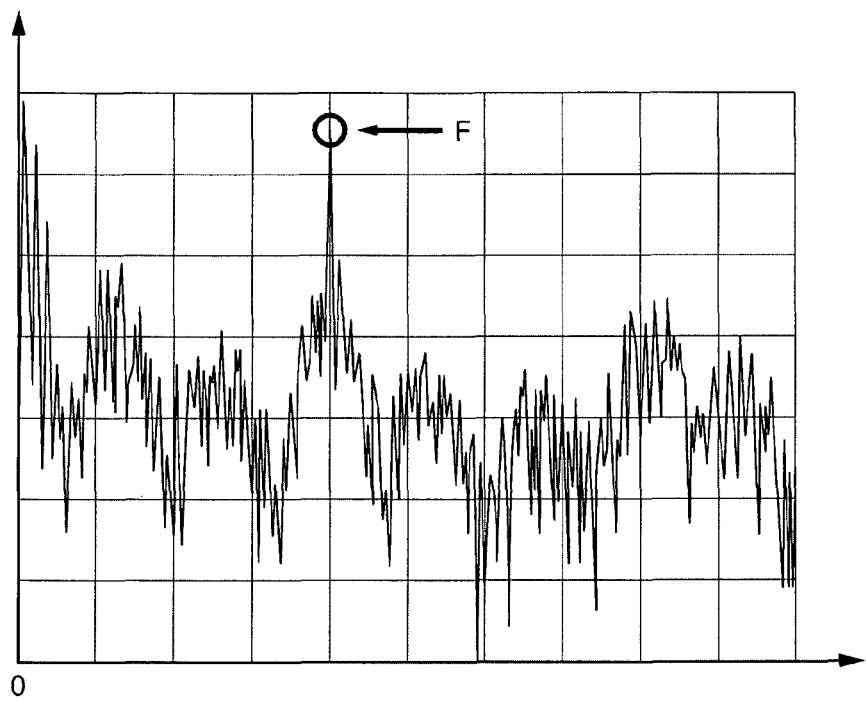
FIG. 3 shows the noise spectrum of a helicopter fitted with a ducted tail rotor while performing an overflying phase for noise certification, showing the emergence of the pure tone corresponding to its fundamental frequency.

Such an anti-torque device with a ducted tail rotor is in general a source of sound nuisance because it emits a pure tone that emerges from the noise spectrum of the helicopter as a whole (or of some other rotorcraft), as shown in FIG. 3 (frequency plotted in Hz along the abscissa and noise level plotted in decibels (dB) up the ordinate). The pure tone identified by an arrow f corresponds to the fundamental tone of frequency bΩ.

In order to enable a rotorcraft to be certified, it is necessary to perform acoustic measurements in order to evaluate the noise produced by the rotorcraft. Under such conditions, the noise levels of pure tones measured in certain frequency bands of the audible spectrum give rise to penalties being applied that are calculated as a function of the emerging nature of pure tones in the noise spectrum, in order to take account of the annoyance caused by such tones.

More precisely, it is recalled that a spectrum is a representation of sound levels as a function of frequency, and noise is the superposition of tones at different levels and frequencies. The noise level expressed in dB (decibels) for each frequency represents the noise spectrum.

In conventional manner, use is made of scales based on octave frequency bands or "octaves" and on one-third octave frequency bands in order to represent a noise spectrum. In principle, frequencies are taken into account up to at least 10,000 Hz and they are grouped together in octave bands centered for example on 63 Hz, 125 Hz, 250 Hz, 500 Hz, 1000 Hz, 2000 Hz, 4000 Hz, and 8000 Hz. Each octave band is subdivided into three one-third octave bands in logarithmic manner.

Figure 4:
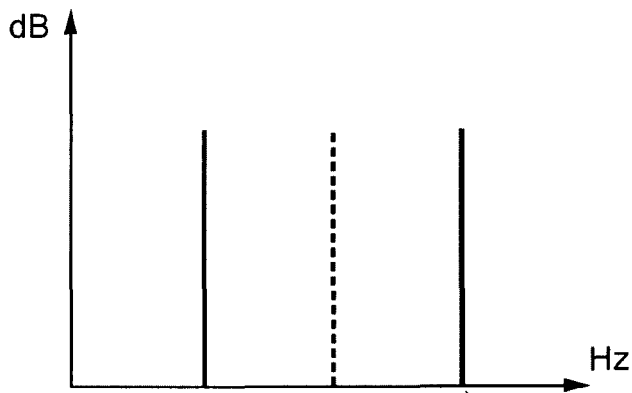
FIG. 4 is a diagram relating to an octave of frequencies.

By definition, and as shown in FIG. 4, the top limit frequency FLS of an octave centered on a center frequency FC is equal to twice the bottom limit frequency FLI of the same octave, i.e.:

$$FLI = \frac{FLS}{2}$$

with the following applying, likewise by definition:

$$FLI = \frac{FC}{\sqrt{2}}$$

$$FLS = \sqrt{2} \times FC$$

Figure 5:
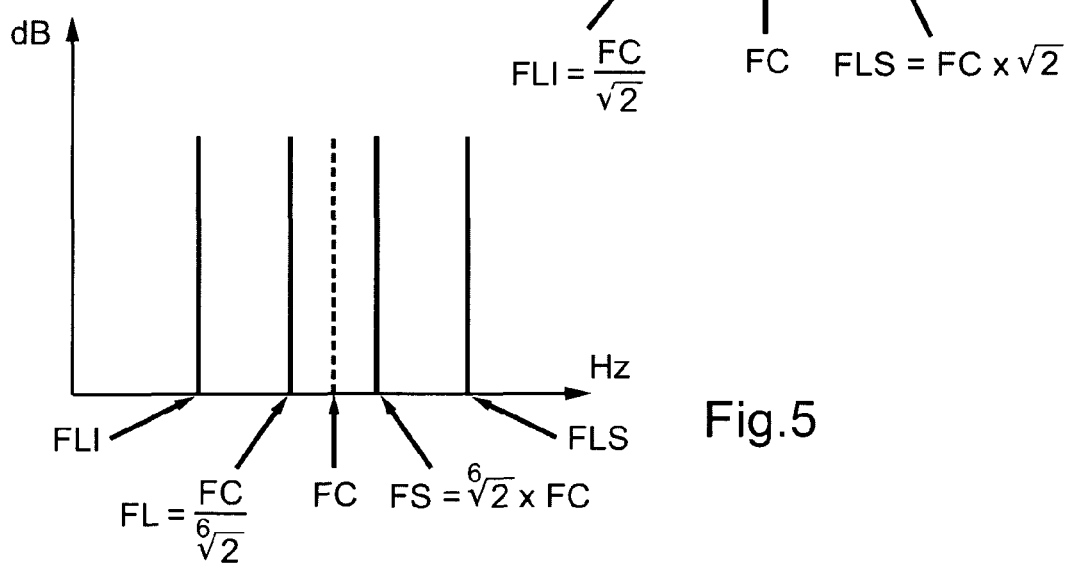
FIG. 5 is a diagram relating to one-third of an octave of frequencies.

Thus, if FL and FS designate respectively the bottom and top limit frequencies of a one-third octave band centered on the frequency FC (FIG. 5), the following relationships are defined:

$$FL = k^2 \times FLI$$

$$FC = k \times FL$$

$$FS = k \times FC$$

$$FLS = k^2 \times FS = k^6 \times FLI$$

with:

$$FLS = 2 \times FLI$$

i.e.:

$$k = \sqrt[6]{2}$$

As a result, the bottom limit FL of the one-third octave band centered on the frequency FC is given by:

$$FL = \frac{FC}{k} = \frac{FC}{\sqrt[6]{2}}$$

Figure 6:
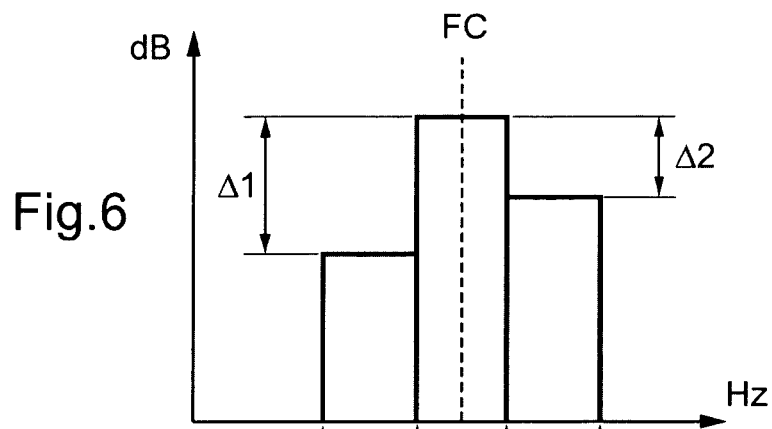
FIG. 6 is a diagram representing the emergence of a pure tone in one-third of an octave.

On this basis, the person skilled in the art determines that a pure tone is emerging in the manner shown in FIG. 6, i.e. by using the quantity:

(Δ1+Δ2)/2

By way of illustration, it can be seen from FIG. 7 that in this example the emergence of a pure tone is evaluated as follows:

$$\frac{\Delta 1 + \Delta 2}{2} = 80.6 - [(67.3 + 66.6)/2] = 13.65 \text{ dB}$$

given that in this example the values 66.6 dB and 67.3 dB are the sound levels of the one-third octave bands lying respectively below and above the one-third octave band presenting the sound level of 80.6 dB, and relating to a pure tone having a frequency of 500 Hz.

Figure 8A:
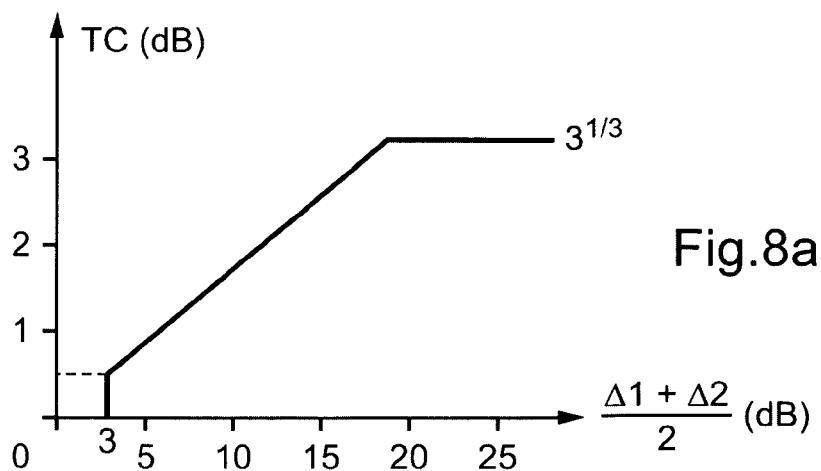
FIGS. 8a and 8b show respectively the pure tone corrections firstly for frequencies below 500 Hz and above 5000 Hz, and secondly for frequencies equal to or greater than 500 Hz and less than or equal to 5000 Hz.
Figure 8B:
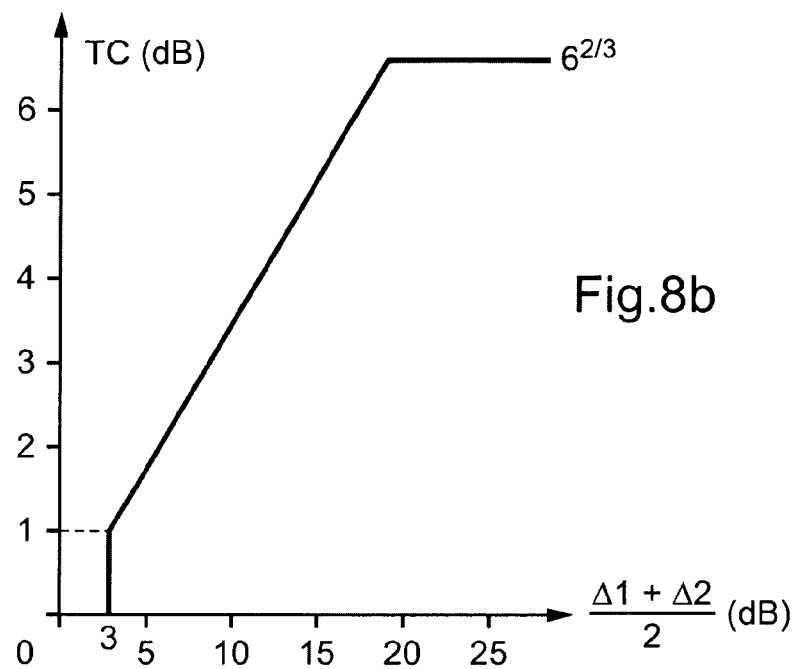

FIGS. 8a and 8b show by way of example the penalties (or pure tone corrections TC) that are applied according to the ICAO recommendations, and in particular:

FIG. 8 relates to pure tone corrections TC for application as a function of the emergence of a pure tone at one-third octave frequencies FR such that:

Fr<500 Hz

Fr>5000 Hz with the correction then being at most $3^{1/3}$ dB;

FIG. 8b relates to pure tone corrections TC to be applied as a function of a pure tone emerging at one-third octave frequencies Fr such that:

500 Hz≦Fr≦5000 Hz the correction then has a maximum of $6^{2/3}$ dB, i.e. twice the correction corresponding to FIG. 8a.

Figure 7:
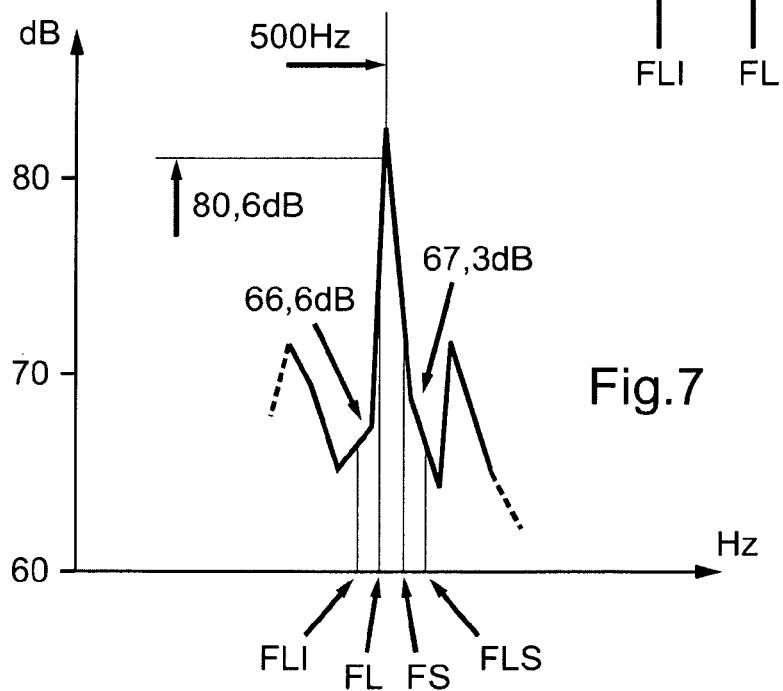
FIG. 7 shows an example of the emergence of a pure tone.

With reference to FIG. 7, the pure tone correction would therefore be 4.55 dB according to FIG. 8b, which is a clear penalty for the rotorcraft from the point of view of obtaining acoustic certification.

The pure tone correction generates a penalty that is over and above the perceived noise level (PNL) expressed in perceived noise decibel (PNdB) units, where the term "tone perceived noise level" or "TPNL noise level" is expressed in units of TPNdB given by:

TPNdB=PNdB+TC

There is no need here to describe in detail how the perceived noise level is determined, other than by giving a brief outline of the procedure:
 the noise history is subdivided into regular segments (generally once every 0.5 seconds) and the associated one-third octave is calculated;
 for each octave spectrum, the perceived noise level PNL is calculated;
 each one-third octave is given a nuisance value expressed in "Noys", a function of the frequency and the level in dB of the one-third octave, and a "Noys spectrum" is obtained for which a maximum value in Noys, referred to as Noymax, corresponds in the example of FIG. 7 to a frequency that is emitted by the anti-torque device; and
 the perceived noise level PNL is calculated using a formula of the type:

$$PNdB = 40 + \frac{10}{\log 2} \log\left(0.15 \sum Noys + 0.85 Noymax\right)$$

By way of example, this procedure leads to defining a TPNL level of 104.1 dB, even though the PNL level (without pure tone correction) is equal to 99.5 PNdB, as applies in the circumstances described above.

As explained above, it can be understood that the invention is advantageous insofar as it consists in designing a ducted tail rotor anti-torque device in such a manner that the pure tone correction TC is less than or equal to $3^{1/3}$ dB (frequency less than 500 Hz).

In this context, it is most important to remember that a sound level increasing by 3 dB, for example, corresponds to doubling the mean instantaneous acoustic energy (measured over a time interval Δt), which is considerable, such that it is always necessary to seek to minimize the penalty (pure tone correction).

Figure 9:
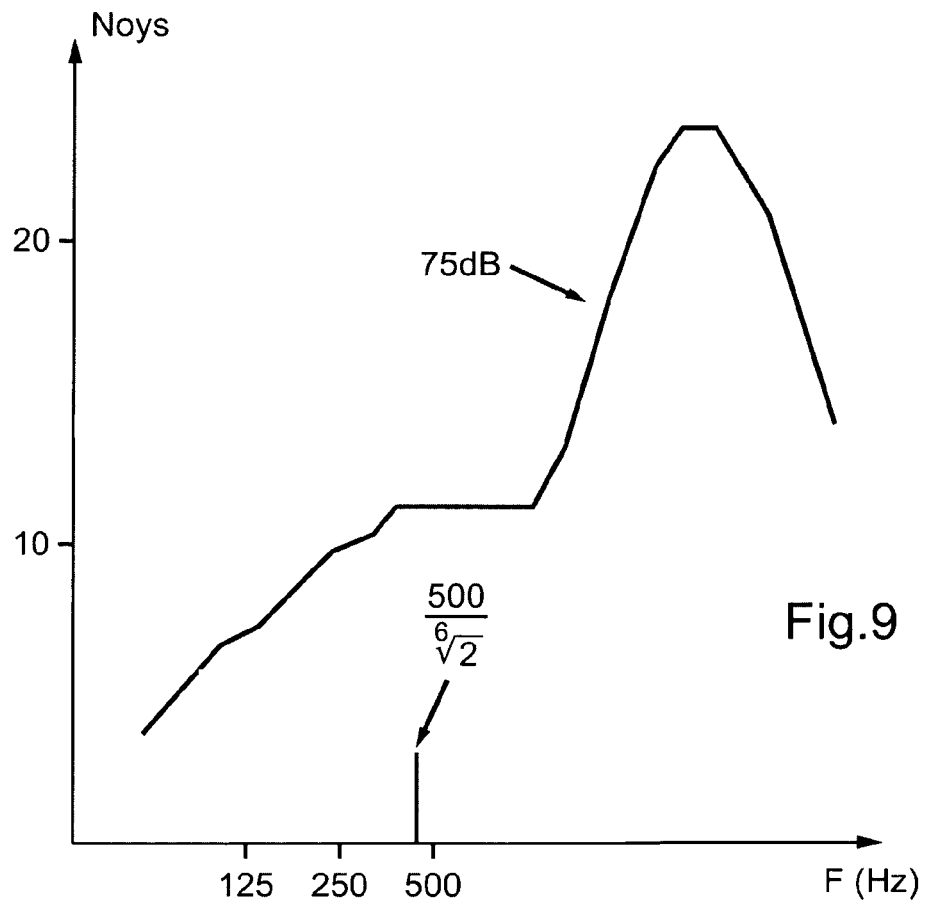
FIG. 9 shows an example of acoustic nuisance (acoustic annoyance) expressed in Noys for a sound level of 75 dB.

Furthermore, an examination of FIG. 9 which shows:
 an abscissa axis representing one-third octave frequencies in Hz;
 an ordinate axis representing nuisance plotted as acoustic discomfit expressed in Noys; and
 an example of a curve relating to a level of 75 dB for the one-third octave containing the detected pure sound;
demonstrates sufficiently clearly, in terms of nuisance, that it is appropriate to reduce as much as possible the frequency of a pure tone, which matches the above observation relating to the pure tone correction giving rise to a penalty.

In patent FR 2 719 549, it is established that spacing the blades of the rotor of a rotorcraft anti-torque device at irregular angles, in application of a sinusoidal relationship, diminishes the noise level of the spectrum line corresponding to the "blade fundamental tone", at a frequency that is equal to the frequency of rotation of the rotor multiplied by the number of blades.

Such a non-uniform angular distribution of the blades can nevertheless lead to an increase in noise level for other spectrum lines and frequencies related to the frequency of rotation as follows:

$F=[(n\times b)\pm m]\times \Omega$

Thus, even if the noise level at the blade frequency bΩ emerges little from the noise spectrum, and/or if its frequency is not situated in a frequency range where the applicable penalty is high, a high penalty can result from an emerging spectrum line corresponding to a frequency that is a harmonic of the blade fundamental tone or to a modulation frequency situated between two such harmonics.

There follows a general solution addressing these problems as provided by the invention.

Figure 10:
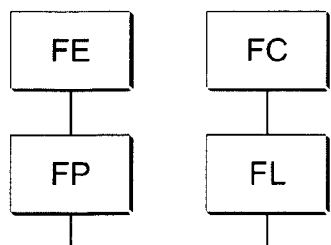
FIG. 10 is a diagram of the method of the invention.

To this end, and as shown in FIG. 10, the method of the invention for optimizing a ducted tail rotor anti-torque device for a helicopter that is noise-certified at a particular forward velocity comprises the following steps:
 a bottom limit frequency FL is selected for a predetermined one-third octave centered on a center frequency FC;
 the perceived frequency FP of the tone produced by said ducted tail rotor anti-torque device is determined by multiplying the emission frequency FE of that tone by a multiplicative coefficient C to take account of the Doppler effect, i.e.:

FP=C×FE the parameters relating to the diameter D of the rotor, the given number b of blades, and to the tangential speed U at the ends of the blades are selected so that the perceived frequency FP of the tone as given by:

C×[U×(n×b)±m]/(π×D)

is less than the bottom limit frequency FL of a predetermined one-third octave centered on a frequency FC, n and m being positive integers and the sign "/" corresponds to division.

Under these conditions, the bottom limit frequency FL is a one-third octave centered on a frequency FC given by:

$$FL = \frac{FC}{\sqrt[6]{2}}$$

Furthermore, the perceived frequency FP takes account of the Doppler effect, as explained above, and is expressed by the relationship:

FP=C×FE

From FIG. 11, the coefficient C can be written as follows:

$$C = \frac{1}{1(M \times \cos\theta_e)}$$

The term M designates the Mach number of the noise-emitting source, i.e. the anti-torque device, traveling at a velocity V, such that if "a" designates the speed of sound at a given temperature, then:

$$M = \frac{V}{a}$$

Figure 11:
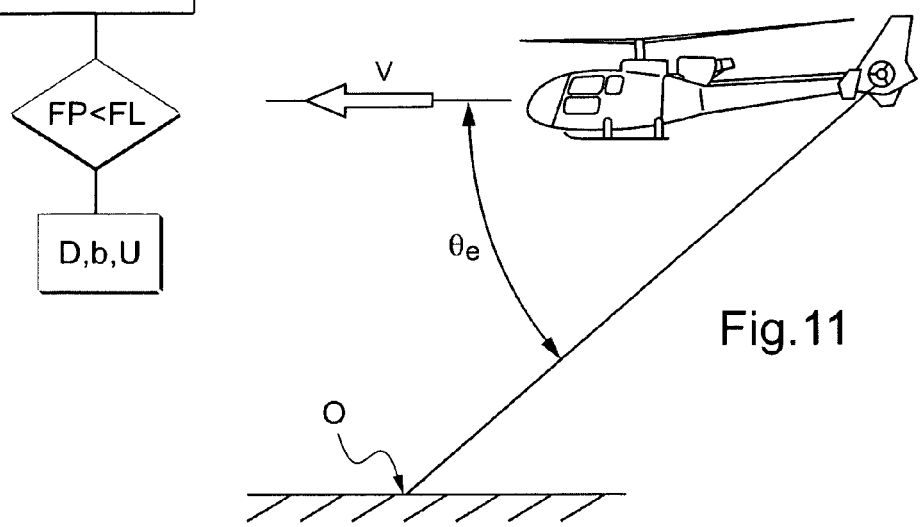
FIG. 11 illustrates the Doppler effect.

The term θe corresponds to the angle between the velocity V and the "source-observer" axis, the observer being O in FIG. 11.

To summarize, the parameters D, U, and b should be selected to satisfy the following criterion:

$$\frac{U \times [(n \times b) \pm m]}{D} < \frac{\pi \times FC}{\sqrt[6]{2}} \times \left[1 - \left(\frac{V}{a} \times \cos\theta e\right)\right]$$

Advantageously, this criterion is preferably applied as follows
- only the fundamental of the spectrum is selected, i.e. n=1 and m=0;
- the predetermined one-third octave corresponding to a center frequency FC of 500 Hz is retained, this frequency corresponding to a standards boundary value as explained above;
- a velocity V corresponding to the noise certification velocity of the rotorcraft is selected, i.e. for example [where V and VH are both expressed in knots (kts)]:

$$V = (0.45 \times VH) + 65 \text{ kts}$$

VH being the maximum velocity of the rotorcraft;
- θe is selected to range in the 30 degrees to 45 degrees; and
- an air temperature is selected lying in the range 15° C. to 25° C., preferably 25° C., giving a speed of sound of 346 meters per second (m/s).

A numerical example of the above-mentioned condition specifying that the frequency FP is less than the frequency FL leads to the following results, for which the center frequency FC, the velocity C, the outside temperature, and the angle θe are respectively equal to 500 Hz, 68 m/s, 25° C. (standard), and 30 degrees:

$$a = 346 \text{ m/s}$$

$$C = 1.2051 \rightarrow \frac{1}{C} = 0.8298$$

$$\frac{U \times n \times b}{D} < 1161 \text{ Hz}$$

Figure 12:
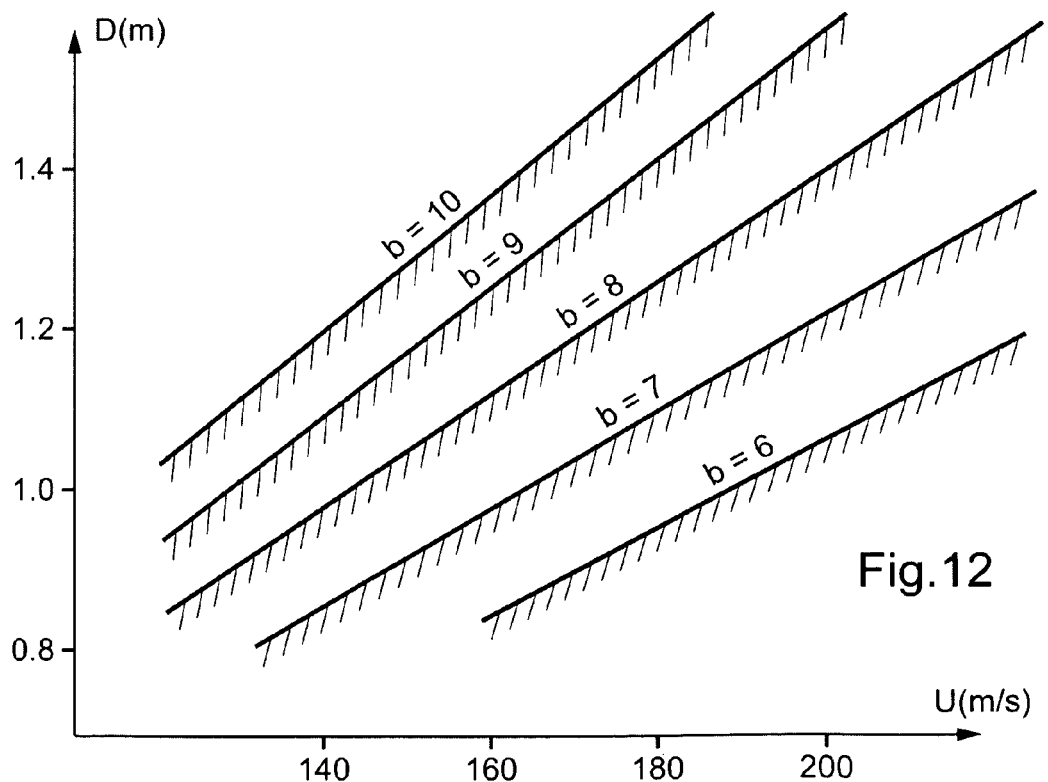
FIG. 12 is a chart showing how to use the noise minimization criterion of the invention.

For n=1, this result leads to the representation of FIG. 12 in which the combinations of D, b, and U that are impossible given the above criterion are shaded relative to each value for b. In other words, for each value of b, the possible combinations of D and U lie in the zone between the straight line relating to the value b and the abscissa axis (giving values of U).

The present invention also provides a ducted tail rotor anti-torque device for controlling and steering a rotorcraft in yaw.

The tail boom 1, shown in FIG. 1, of a helicopter that is noise-certified at a forward velocity V and having a fuselage and a single main rotor that are not shown, carries at its rear end, as specified above: a vertical fin 3 for providing assistance in yaw control, and in front of the fin a horizontal tailplane 4 in two portions extending on either side of the boom 1 to provide assistance in pitch control of the helicopter.

At the base of the vertical fin 3 there is arranged a fairing 5 that is pierced transversely by an airflow duct 6 forming part of a ducted anti-torque device 2 that also includes a multi-bladed rotor 7 of diameter D with a given number b of variable pitch blades 10, mounted to rotate at a speed of rotation Ω substantially coaxially in the duct 6, together with a deflector stator 8 stationary in the duct 6 and in front of the rotor 7 relative to the flow direction of the air passing along the duct 6, and comprising stationary vanes 9 disposed substantially in a star configuration around the axis x-x of the duct 6.

With reference to FIG. 1, this anti-torque device 2 is remarkable in that the parameters relating to the diameter D of the rotor, the given number b of blades, and the tangential speed U in meters per second (m/s) equal to π×D×Ω at the ends of the blades are such that:

$$\frac{U \times [(n \times b) \pm m]}{D} < \frac{\pi \times FC}{\sqrt[6]{2}} \left[1 - \left(\frac{V}{a} \times \cos\theta e\right)\right]$$

where n and m designate positive integers, FC is the center frequency of a predetermined one-third octave, and the terms a and θe represent respectively the speed of sound and the angle lying between the velocity V and the axis between the source of noise, i.e. the anti-torque device and the observer.

Advantageously, and preferably, the following apply:
- the integer n is equal to 1;
- the center frequency FC is 500 Hz;
- the velocity V of the rotorcraft, where VH designates the maximum velocity of the rotorcraft, is given by [(0.45× VH)+65 kts];
- the angle θe lies in the range 30 degrees to 45 degrees; and
- the temperature of the air lies in the range 15° C. to 25° C., and is preferably 25° C., giving a speed of sound of 340.26 m/s.

Advantageously, the anti-torque device 2 comprising a ducted tail rotor may also include a deflector stator 8 secured in the duct 6 downstream from the rotor 7 relative to the flow direction of the air passing through the duct 6, and having stationary vanes 9 disposed substantially in a star around the axis x-x of the duct 6.

Naturally, the present invention can be subjected to numerous variations as to its implementation. Although several embodiments are described, it will readily be understood that it is not conceivable to identify exhaustively all possible embodiments. It is naturally possible to envisage replacing any of the means described by equivalent means, without thereby going beyond the ambit of the present invention.

What is claimed is:

1. A method of optimizing an anti-torque device (2) for a rotorcraft that is noise certified at a forward velocity V, the rotorcraft comprising a multi-bladed ducted tail rotor (7) of diameter D with a given number b of variable pitch blades (10), mounted to rotate at a speed of rotation Ω substantially coaxially in an airflow duct (6) of axis extending substantially transversely relative to the rotorcraft and passing through a fairing (5) incorporated in the tail portion of the rotorcraft, wherein the following steps are performed:
- a bottom limit frequency FL is selected for a predetermined one-third octave centered on a center frequency FC;
- the perceived frequency FP of the tone produced by said ducted tail rotor anti-torque device is determined by multiplying the emission frequency FE of that tone by a multiplicative coefficient C to take account of the Doppler effect, i.e.:

$$FP = C \times FE$$

the parameters relating to the diameter D of the rotor, the given number b of blades, and to the tangential speed U at the ends of the blades are selected so that the perceived frequency FP of the tone as given by:

$$C \times [U \times (n \times b) \pm m]/(\pi \times D)$$

is less than the bottom limit frequency FL of a predetermined one-third octave centered on a frequency FC, n and m being positive integers.

2. A method according to claim 1, wherein said coefficient C is such that:

$$C = \frac{1}{1-(M \times \cos\theta e)}$$

in which expression M designates the Mach number of the noise-emitting source, i.e. the anti-torque device, traveling at a forward velocity V, the Mach number being equal to the ratio V/a where "a" represents the speed of sound, and θe designates the angle formed between the forward velocity V and the axis between the noise source and the observer.

3. A method according to claim 2, wherein a temperature range of 15° C. to 25° C. is used for determining the speed of sound.

4. A method according to claim 2, wherein said angle θe is selected to lie in the range 30 degrees to 45 degrees.

5. A method according to claim 2, wherein the forward velocity V expressed in knots is equal to:

$$V=(0.45 \times VH)+65 \text{kts}$$

where VH is the maximum velocity of the rotorcraft.

6. A method according to claim 1, wherein said center frequency FC is equal to 500 Hz.

7. A method according to claim 1, wherein the integer numbers n and m are respectively equal to 1 and 0.

8. An acoustically optimized anti-torque device (2) for a rotorcraft that is noise certified at a forward velocity V, the device comprising a multi-bladed ducted tail rotor (7) of diameter D having a given number b of variable pitch blades (10), mounted to rotate a speed of rotation Ω substantially coaxially in an airflow duct (6) of axis extending substantially transversely relative to the rotorcraft and passing through a fairing (5) incorporated in the rear portion of the rotorcraft, wherein the parameters relating to the diameter D of the rotor, to the given number b of blades, and to the tangential speed U, equal to Ω×(D×2), at the ends of the blades are such that:

$$\frac{U \times [(n \times b) \pm m]}{D} < \frac{\pi \times FC}{\sqrt[6]{2}}\left[1-\left(\frac{V}{a} \times \cos\theta e\right)\right]$$

where n and m are positive integers, FC is the center frequency of a predetermined one-third octave, and a and θe represent respectively the speed of sound and the angle between the forward velocity V and the axis between the noise source, i.e. the anti-torque device and the observer.

9. A device according to claim 8, wherein the speed of sound a lies in a range appropriate for an outside temperature lying in the range 15° C. to 25° C.

10. A device according to claim 8, wherein said angle θe lies in a range 30 degrees to 45 degrees.

11. A device according to claim 8, wherein the forward velocity V expressed is knots is equal to:

$$[(0.45 \times VH)+65 \text{ kts}]$$

VH designating the maximum forward velocity of the rotorcraft.

12. A device according to claim 8, wherein the center frequency FC is equal to 500 Hz.

13. A device according to claim 8, wherein said ducted tail rotor anti-torque device (2) includes a deflector stator (8) stationary in the duct (6), downstream from the rotor (7) relative to the flow direction of the air flowing through the duct (6) and comprising stationary vanes (9) disposed substantially in a star configuration about the axis x-x of the duct (6).

* * * * *